UNITED STATES PATENT OFFICE.

EDWIN ERNEST JELLEY, OF MALVERN, NATAL, SOUTH AFRICA.

PRODUCTION OF PHOTOGRAPHS ON PAPER, PARCHMENT, AND THE LIKE.

No Drawing.    Application filed August 1, 1925. Serial No. 47,634.

This invention relates to an improved process for the production of photographic prints from negatives, on paper, parchment, and the like.

It is the object of the present invention to render unnecessary the use of a colloidal emulsion, such as gelatin or collodion, as a vehicle to contain the salt of silver, by applying a soluble salt of silver in aqueous solution directly to the surface to be sensitized.

Another object of the invention is to produce a photographic paper which will keep indefinitely when stored in darkness.

A further object of the invention is to produce a photographic paper that requires only a reasonable exposure to daylight or other actinic light, but which, nevertheless, may be developed in diffused daylight or bright artificial light, thus rendering a darkened room unnecessary.

A still further object of the invention is to render possible the production of all shades or tones of black and brown, either by altering the length of exposure of the paper, or by altering the nature of the developing substance used, thereby rendering unnecessary the use of special toning solutions.

According to the present invention, any pure paper is sensitized by directly coating its surface with a solution containing a silver salt, soluble in water to a greater extent than 0.01 parts by weight in 100 parts by weight of water, and chemically combined with one or more of the three higher halogens, and a water soluble, non-volatile, crystallizable weak acid. The substances which are preferably used for treating the paper are silver chlorate and citric acid.

Paper thus prepared may be exposed through a photographic negative to light until an image is faintly visible, after which it is developed in an organic reducing agent, which dissolves the soluble silver salt and acid from the paper, and, whereby metallic silver is formed which is deposited on the silver nuclei comprising the original latent or faint image on the exposed paper. These silver nuclei act catalytically by enormously increasing the speed of reduction of the silver salt in the menstruum in their immediate vicinity.

When the paper after coating does not contain sufficient soluble silver salt to give the necessary density of image, the paper after exposure is developed in a solution having a hydrogen-ion concentration of from 0.0001 up to 0.01, and containing sufficient soluble silver salt to give the required intensity of image, in conjunction with an organic reducing agent capable of effecting complete development within a period of from one minute up to twenty minutes.

In carrying the invention into effect the paper to be sensitized is preferably coated with a solution containing a halogen chemically combined with a silver salt of which the solubility is over 5 grms. per 100 ccms. of water. This solution is applied directly to the surface of the paper, and the resulting paper will contain sufficient silver salt to give the requisite density to the developed image. If however the silver salt used has a solubility between 0.01 and 5 parts by weight in 100 parts by weight of water, the silver salt is formed on the surface itself by double decomposition. For example if the paper is to be sensitized with silver bromate, a ten per cent solution of silver nitrate is applied to the paper, which is then dried, and to the surface of the dried paper there is applied an excess of a solution of a soluble bromate, for example, sodium bromate.

In order to preserve the paper a water soluble, non-volatile, crystallizable, weak acid, that is incapable of giving, even in concentrated aqueous solution, a hydrogen-ion concentration of more than 0.2 is added to the solution before it is applied to the paper. Citric and tartaric acids are suitable for this purpose and they have the advantage of comparative cheapness. The amount of acid to be added to the paper may be varied within wide limits. It has however been found that when a silver salt of low solubility is used less acid is required for the preservation of the paper than when a silver salt of higher solubility is used. The amount of acid used preferably depends on the amount of silver salt present, and the following proportions give satisfactory results.

| Solubility of silver salt, grms. per 100 ccms. | Amount of acid in grms. per 1 grm. silver salt. |
|---|---|
| 0.01 | 0.1 up to 5 |
| 0.1 | 10 |
| 1 | 20 |
| 10 | 40 |

Satisfactory results are obtained when the paper or the like after treatment contains 0.0005 grm. of silver chlorate and 0.02 grm. of citric acid per square centimetre of sensitized surface. In some cases the silver salt and the weak acid may be applied to the paper simultaneously; for example the surface may be sensitized by application of a solution containing 10 parts by weight of silver chlorate and 40 parts by weight of tartaric acid, dissolved in 100 parts by weight of water. Nevertheless, it has been found that the best results are obtained when the paper is firstly sensitized by the application of an aqueous solution of a suitable silver salt to its surface, and, after drying, is treated with a solution of the water-soluble, non-volatile, crystallizable weak acid. The weak acid, such as, citric acid, tartaric acid, 2.3.6. trichlorobenzoic acid, or the like is preferably dissolved in methyl or ethyl alcohol, so that the application of the solution of acid may in no way interfere with the previously sensitized surface.

A preferred method of sensitizing paper according to the present invention consists in coating the paper with a solution of 10 parts by weight of silver chlorate dissolved in 100 parts by weight of water at 20° The paper may be either sprayed or brushed with the solution, or the solution may be applied by means of rollers of glass or the like. The sensitized paper is then treated with a solution of citric acid in alcohol. A convenient strength for this solution is 50 parts by weight of pure citric acid dissolved in 100 parts by weight of alcohol. Alcohol of strength 95 per cent by volume is quite satisfactory. This alcoholic solution of citric acid may be either sprayed on to the paper, or else applied by means of brushes, rollers or the like. Silver chlorate is practically insoluble in alcohol so that the sensitized surface of the paper does not suffer any damage from the solution of the acid. The alcoholic solution of the acid soaks right through the paper so that on the evaporation of the alcohol, the paper is completely impregnated with the acid. The citric acid thus crystallized within the fibres of the paper serves a dual purpose namely it preserves the paper and it provides the necessary acid for the subsequent development of the paper so that it is possible to develop the paper with a solution containing a suitable reducing agent only. Paper rendered sensitive with silver chlorate in conjunction with citric acid, in the manner above described, will keep for an indefinite period when stored in darkness in an airtight or damp-free container.

It has been found that paper containing at least 0.0005 grm. of a soluble silver salt to each square centimetre of sensitized surface, does not require the addition of a soluble silver salt to the developing solution to give the necessary density of developed image. If however the sensitized paper contained less than 0.0005 grm. of a soluble silver salt is necessary to add a soluble silver salt to the developer. For this purpose from 1½ to twice the calculated deficiency of soluble silver salt in the paper is added to the developer. For example when a piece of paper 9x12 cms. contains 0.0001 grm. of silver chlorate per sq. cm. it is necessary to add between 0.049 grm. and 0.065 grm. of silver chlorate or an equivalent amount of any other silver salt soluble in water, such as silver nitrate, to the developer. The variation in the amount required is due to the varying amount of image on the paper. Up to ten times the above proportion of soluble silver salt may be added to the developer, the excess having no injurious effect on the paper and being merely wasted. In cases where the original amount of soluble silver salt in the sensitized paper is not known, 0.0009 grm. of silver nitrate are preferably added to the developer for each square centimetre of sensitized surface.

Paper sensitized according to the present method will keep for an indefinite period when stored in a dry, dark place, as any slight decomposition which takes place in the paper in the presence of the acid with which it has been treated results in the formation of a practically insoluble silver halide which does not exert any action on the developer to be subsequently used. Paper sensitized with soluble silver salts which are not chemically combined with one of the three higher halogens cannot be stored indefinitely and subsequently produce unsatisfactory results as minute particles of metallic silver are formed so that when developing such a deteriorated paper, silver is deposited all over the surface with consequent fogging.

Although fluorine is a halogen, it cannot be used as a substitute for the halogens above referred to as silver fluoride is not the final product of decomposition of soluble silver salts containing combined fluorine, by reason of the great solubility of silver fluoride.

Of the three higher halogens that can be used for the purposes of the present invention, iodine has proved to be somewhat inferior to bromine and chlorine, whilst soluble silver salts containing combined chlorine have proved to be the most effective. The principal soluble silver salts that may be used include silver chlorate, silver perchlorate, silver bromate, and silver salts of organic acids containing substituted chlorine, bromine, or iodine, which are soluble in water to a greater extent than 0.01 parts by weight in 100 parts by weight of water at atmospheric temperature, such as silver 2.3 dichlorobenzoate, silver 2.5 dichlorobenzoate, silver 2.3.4. trichlorobenzoate, silver 2.3.6. trichlorobenzoate, silver chlorosalicylate, silver dichlorosalicylate, silver orthochlorobenzoate, silver orthobromobenzoate, silver 2.3.4.5. tetrachlorobenzoate, silver 3.4.5.6. tetrachlorobenzoate, silver dichlorobenzenesulphonate, or the like.

Any pure paper may be used as a base to be sensitized according to the present invention, but the colour, thickness and surface of the paper should be such that the finished photographs have a pleasing effect. For most purposes a stout white paper of fine texture is suitable.

Paper sensitized according to the present process and containing at least 0.0005 grm. of silver salt and 0.02 grm. of a water soluble, non-volatile, crystallizable, weak acid to each sq. cm. will give a wide range of tones according to the exposure given to the paper and to the developer used.

With paper prepared with silver chlorate in conjunction with citric acid, the following tones may be obtained by developing with a solution of 1 grm. of metol (methyl-para-aminocresol sulphate) in 500 ccms. of water.

Bluish-black by exposing for 2 seconds to sunlight.

Black by exposing for 4 seconds to sunlight.

Warm black by exposing for 10 seconds to sunlight.

Sepia by exposing for 40 seconds to sunlight.

Warm brown by exposing for 2 minutes to sunlight.

By using a developer consisting of 0.3 grm. of metol and 2.0 grms. of hydroquinone, dissolved in 500 ccms. of water, the following tones may be obtained:—

Sepia by exposing for 4 seconds to sunlight.

Warm brown by exposing for 10 seconds to sunlight.

A developer consisting of 2 grms. of pyrogallol in 500 ccms. of water gives warm brown tones with exposures varying from 2 seconds up to 5 minutes.

The exposures given above are for a negative of normal density. The paper may be exposed by means of diffused daylight, arc light, the light from burning magnesium ribbon, or any other actinic light. When the paper has been given a very short exposure of say, 2 seconds to sunlight, only the very deepest shadows are visible on the paper, the remainder of the image being latent, but the exposure may be increased to such an extent that the picture has almost the necessary intensity, whereupon the picture is given a brief treatment in the developer. From the foregoing it will be seen that the paper has an enormous range of latitude in its exposure, which is a great practical advantage.

The development of the paper according to the present process may be performed in diffused daylight or bright artificial light, a darkened room being quite unnecessary. After the development of the exposed paper has been completed, the paper must be well washed in water, say for a minute in running water, to remove any remaining silver salt, acid and developer. The prints are then fixed in the following solution:—

Sodium thiosulphate, 10 grammes; sodium bi-carbonate, 5 grammes; and sufficient water to make, 100 ccms.

If desired, an acid fixing bath may be used, though the above solution has the advantage of being cheap and preventing subsequent fading of the finished prints. Fixation is complete in a minute or two, when the paper can then be washed and dried in the usual manner.

When, however, the paper sensitized according to the present invention contains less than 0.005 grm. of soluble silver salt to each square centimetre of sensitized surface, it is necessary to add soluble silver salt to the developer, and to modify the exposure of the paper in order to obtain a sufficiently dense and clear image. The most important difference in the procedure is that the paper must only be given a short exposure to light, and the required tone obtained by using different reducing agents. Thus to obtain black tones, the paper is printed until the densest shadows are only faintly visible, and is then developed in a solution consisting of Metol (methyl - para - aminocresol sulphate), 0.1 gram; citric acid, 1.0 gram; silver nitrate, 0.05 up to 0.1 grm.; water, 30 ccms.

This amount of solution is sufficient for one piece of paper 9x12 cms. and should only be used once. The silver nitrate may be replaced by any other soluble silver salt, excepting silver permanganate and nitrite, which destroy the developer.

Cold sepia tones are obtained by developing in a solution in which citric acid is replaced by tartaric acid or in the following solution:—

Hydroquinone, 0.15 gram; metol (methylparaaminocresol sulphate) 0.05 gram; silver nitrate, 0.05 up to 0.1 grm.; citric acid, 2.0 grams; water, 30 ccms.

Warm brown tones are obtained by developing in the following solution:—

Pyrogallol, 0.4 gram; citric acid, 1.0 gram; silver nitrate, 0.05 up to 0.1 grm.; water, 30 ccms.

In order to obtain good results when developing paper sensitized according to the present process, it is essential to keep the hydrogen-ion concentration of the developer within the limits 0.0001 up to 0.01. Highly ionized acids such as sulphuric acid are thus of little use for the present purpose, the moderately ionizable acids being much more easy to control; thus the amount of citric acid in the developer may be varied between 1 and 25 per cent without substantially affecting the nature of the developed image. The complete development of the paper may take from one minute up to twenty minutes, the organic reducing agent being added in such quantity that the time of development is between these approximate limits. In practical work it is convenient to control the development so that it is complete in three minutes. After exposing a paper which contains over 0.0005 gram of soluble silver salt per sq. cm. in conjunction with a suitable amount of a water soluble, non-volatile, crystallizable acid, the exposed paper may be placed in a dish with sufficient water to cover it to a depth of 0.2 to 0.5 cm., and a concentrated solution of the reducing agent is added gradually, with constant agitation, until the development acquires the necessary speed. The only recognized photographic developer that will not give good results when manipulated in this way is di-amidophenol (amidol), as this has a tendency to fog the paper. This is probably due to the fact that with developing solutions having a hydrogen-ion concentration of 0.0001 up to 0.01, amidol causes the development to take place in less than one minute. The acid used to give the developer the required hydrogen-ion concentration must not be capable of forming an insoluble compound from or with the soluble silver salt, as insoluble silver salts cannot be developed according to the present process. The presence of hydrochloric acid in the developer prevents the formation of metallic silver on to the original faint image.

As the silver salt is dissolved out from the paper and passes into the developer from which it is re-deposited as metallic silver on to the original faint or latent image formed by exposure to light, the developing dish must be scrupulously clean and entirely free from particles or stains of metallic silver which act as nuclei, and cause the silver from the developer to be deposited on to the dish instead of the paper. Glass dishes have been found the most satisfactory, and these can be cleaned with concentrated nitric acid. Dishes of vulcanite, enamelware, porcelain, or papier-mâché may also be used for the development but they must first be coated with a layer of hard paraffin wax. When the layer of paraffin wax becomes soiled, it may be removed with hot water and the dish recoated with paraffin wax.

By utilizing soluble salts of silver chemically combined with one or more of the three higher halogens in conjunction with a water soluble, non-volatile, crystallizable acid in the preparation of a photographic paper according to the present invention the following advantages are obtained:—

(1) The use of an emulsion of a colloidal substance, such as gelatin or collodion, as a vehicle to contain the silver salt, is renderd unnecessary.

(2) The sensitizing of paper by means of solutions of silver salts, and preserving the paper by applying an acid dissolved in a suitable solvent, may be performed mechanically with great rapidity, and the coating appliance need only be very simple.

(3) The paper sensitized for use according to the present invention can be prepared very cheaply.

(4) The paper may be exposed, developed, and fixed in diffused daylight or bright artificial light, thereby rendering the use of a darkened room unnecessary.

(5) The paper can be subjected to an enormous latitude in exposure.

(6) A very great range of tones can be obtained on the paper prepared according to the present invention either by varying the exposure or development of the paper, thereby rendering the use of special toning solutions unnecessary.

Having thus described my invention what I claim as new and desire to secure by Letters Patent is:—

1. A process for sensitizing paper, parchment and the like, consisting in applying directly to the paper a water soluble silver salt molecularly containing a halogen other than fluorine, and a water soluble, non-volatile, crystallizable, weak acid, without the use of a colloidal emulsion.

2. A process for sensitizing paper, parchment and the like consisting in applying directly to the paper a water soluble silver salt molecularly containing a halogen other than fluorine, said salt being soluble in water to a greater extent than 0.01 part by weight in 100 parts by weight of water, and a water soluble, non-volatile, crystallizable, weak acid without the use of a colloidal emulsion.

3. A process for sensitizing paper, parchment and the like consisting in applying directly to the paper silver chlorate, and a water soluble, non-volatile, crystallizable, weak acid, without the use of a colloidal emulsion.

4. A process for sensitizing paper, parchment and the like, consisting in applying directly to the paper a water soluble silver salt molecularly containing a halogen other than fluorine and citric acid, without the use of an emulsion.

5. A process for sensitizing paper, parchment and the like consisting in applying directly to the paper silver chlorate, and citric acid without the use of a colloidal emulsion.

6. An improved process for the production of photographs on paper, parchment and the like, consisting in applying to the paper or the like a solution containing a water soluble silver salt molecularly containing a halogen other than fluorine and a water soluble, non-volatile, crystallizable, weak acid, without the use of a colloidal emulsion, exposing the sensitized paper to light behind a negative, and developing the image obtained in a solution of an organic reducing agent which dissolves the silver salt and the acid from the paper and deposits metallic silver on the developed image.

7. An improved process for the production of photographs on paper, parchment and the like, consisting in applying to the paper or the like a solution containing silver chlorate and citric acid, without the use of a colloidal emulsion, exposing the sensitized paper to light behind a negative and developing the image in a solution of an organic reducing agent which dissolves the silver salt and the acid from the paper and deposits metallic silver on the developed image.

8. An improved process for the production of photographs on paper, parchment and the like consisting in applying to the paper or similar material a water soluble silver salt, molecularly containing a halogen other than fluorine, and a water soluble, non-volatile, and crystallizable weak acid, without the use of a colloidal emulsion, exposing the sensitized paper to light behind a negative and developing the image in a solution having a hydrogen-ion concentration of from 0.0001 up to 0.01, and containing sufficient soluble silver salt to give the required intensity of image, in conjunction with an organic reducing agent capable of effecting complete development within a period of from one minute up to twenty minutes.

9. An improved process for the production of photographs on paper, parchment and the like, consisting in applying to the paper or the like a solution containing a water soluble silver salt molecularly containing a halogen other than fluorine, said salt being soluble in water to a greater extent than 0.01 part by weight in 100 parts by weight of water and a water soluble, non-volatile, crystallizable, weak acid, without the use of a colloidal emulsion, exposing the sensitized paper to light behind a negative, and developing the image in metol (methyl-paraaminocresol sulphate).

10. An improved process for the production of photographs on paper, parchment and the like, consisting in applying to the paper or the like a solution containing a water soluble silver salt, molecularly containing a halogen other than fluorine and a water soluble, non-volatile, crystallizable, weak acid without the use of a colloidal emulsion, exposing the sensitized paper to light behind a negative and developing the image in a solution having a hydrogen-ion concentration of from 0.0001 up to 0.01 and containing sufficient soluble silver salt to give the required intensity of image in conjunction with metol (methyl-paraminocresol sulphate).

11. An improved process for the production of photographs on paper, parchment, and the like consisting in applying to the paper or the like a solution containing a water soluble silver salt molecularly containing a halogen other than fluorine, and a water soluble, non-volatile, crystallizable, weak acid, without the use of a colloidal emulsion, exposing the sensitized paper to light behind a negative and developing the image in a solution consisting of metol (methyl-paraaminocresol sulphate), citric acid, silver nitrate, and water.

12. An improved process for the production of photographs on paper, parchment and the like consisting in applying to the paper or the like a solution containing a water soluble silver salt molecularly containing a halogen other than fluorine, and a water soluble, non-volatile, crystallizable, weak acid, exposing the sensitized paper to light behind a negative, and developing the image in a solution consisting of hydroquinone, metol (methyl-paraaminocresol sulphate), silver nitrate, citric acid, and water.

13. As an article of manufacture a sensitized paper free from colloidal emulsion and which will retain its properties indefinitely when stored in the dark, consisting of a pure paper base containing a water soluble silver salt, molecularly containing a halogen other than fluorine, said salt being soluble in water to a greater extent than 0.01 by weight in 100 parts by weight of water and treated with a water soluble, non-volatile, crystallizable, weak acid.

14. As a new article of manufacture an improved sensitized paper free from colloidal emulsion consisting of a pure paper base containing silver chlorate and citric acid.

15. An improved process for the production of photographs on paper, parchment, and the like consisting in applying to the paper or the like a solution containing a water soluble silver salt molecularly containing a halogen other than fluorine, and a water soluble, non-volatile, crystallizable, weak acid exposing the sensitized paper to light behind a negative and developing the image in a solution consisting of metol (methyl-paraaminocresol sulphate) 1 grm., citric acid, silver nitrate 0.05 up to 0.1 grm., water 30 ccms.

16. An improved process for the production of photographs on paper, parchment and the like consisting in applying to the paper or the like a solution containing a water soluble silver salt molecularly containing a halogen other than fluorine, and a water soluble, non-volatile, crystallizable, weak acid, exposing the sensitized paper to light behind a negative, and developing the image in a solution consisting of hydroquinone 0.15 grm., metol (methyl-paraaminocresol sulphate) 0.05 grm., silver nitrate 0.05 up to 0.1 grm., citric acid 2 grms., water 30 ccms.

EDWIN ERNEST JELLEY.